Figure 1:
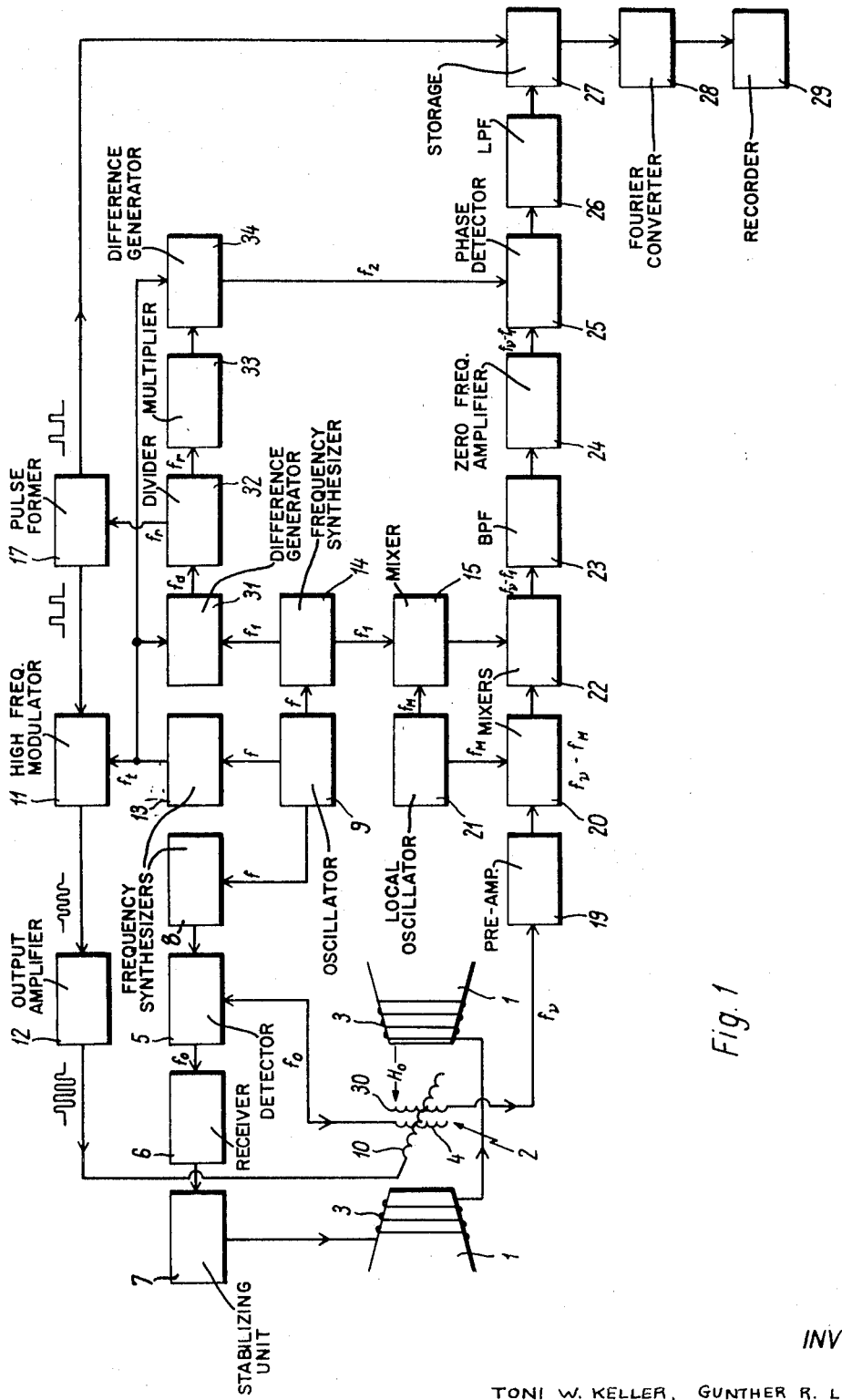

United States Patent [19]
Keller et al.

[11] 3,720,816
[45] March 13, 1973

[54] METHOD FOR FOURIER ANALYSIS OF INTERFERENCE SIGNALS

[75] Inventors: Toni W. Keller; Gunther R. Laukien; Werner H. Tschopp, all of Zurich Faellanden, Switzerland

[73] Assignee: Spectrospin AG, Zurich-Fallanden, Switzerland

[22] Filed: Nov. 6, 1970

[21] Appl. No.: 87,418

[30] Foreign Application Priority Data

Nov. 8, 1969 Germany.....................P 19 56 331.6
April 10, 1970 Germany.....................P 20 17 139.5

[52] U.S. Cl...........235/151.3, 235/151.35, 324/.5 A, 324/77 R
[51] Int. Cl.............................G06f 15/34, G06g 7/19
[58] Field of Search..............235/151.3, 151.35, 156; 324/.5 A, 77 R

[56] References Cited

UNITED STATES PATENTS

| | | | |
|---|---|---|---|
| 3,581,191 | 5/1971 | Anderson | 235/151.35 |
| 3,475,680 | 10/1969 | Anderson et al. | 324/.5 A |
| 3,530,371 | 9/1970 | Nelson et al. | 324/.5 A |
| 3,564,399 | 2/1971 | Laukien | 324/.5 A |
| 3,495,162 | 2/1970 | Nelson | 324/.5 A |
| 3,588,678 | 6/1971 | Ernst | 324/.5 A |
| 3,581,193 | 5/1971 | Laukien | 324/.5 A |

*Primary Examiner*—Eugene G. Botz
*Assistant Examiner*—James F. Gottman
*Attorney*—Craig, Antonelli & Hill

[57] ABSTRACT

Interference signals such as those obtained in nuclear spin spectrometry are subjected to a Fourier analysis in which the frequencies and amplitudes of the interference signals are determined mathematically. The excitation of the sample produces interference signals, all the oscillations of a definite frequency band are filtered out, and the Fourier analysis is performed on this frequency band. The selected portion of the interference oscillations is varied by varying the frequency band and the center frequency thereof in reference to the frequency content of the whole interference signal. One frequency may be produced in a fundamental oscillator and various frequencies, for example for use in mixing circuits, are obtained by frequency multiplication and division.

28 Claims, 6 Drawing Figures

METHOD FOR FOURIER ANALYSIS OF INTERFERENCE SIGNALS

The invention relates to a method for Fourier analysis of interference signals especially interferograms such as are obtained for example in spin resonance spectrometry in which method the frequency and amplitudes of the oscillations forming the interference signal are determined mathematically.

In this art signals having a limited time period often occur which are produced by the interference of several oscillations of different frequencies and which will be referred to hereinafter briefly as interference signals. The graphical display of such an interference signal forms an interferogram. Such interferograms can always be obtained if structures which can execute natural vibrations at several frequencies are excited simultaneously at their respective natural resonance frequencies and then their output signal is determined. It is immaterial whether the excitation and/or output signals are of an electro-magnetic, acoustic or mechanical nature. For the assessment of the interference signals one is concerned with displaying a spectrum if there is understood thereby in general the assessment of the amplitudes of signals of various frequencies dependently on the frequency even if in the case of interferograms all the resulting signals are displayed simultaneously and in superimposition. As stated an electro-magnetic spectrum in a desired region, especially in the optical region including infra-red and ultra-violet, or in the region of X-rays or also acoustic or mechanical spectra may be involved.

In the measurement of spectra the difficulty often arises that the amplitude of the output signal is only very small so that these signals can only be extracted insufficiently from the noise level which is always present. For improving the signal/noise ratio it is known to repeat the measurement of a spectrum many times and to add the measurement values thereby obtained. If all the experimental conditions are held constant the signal amplitude increases n-fold for $n$ repetitions, whereas the noise voltage increases as a result of its statistical character only by $\sqrt{n}$ times. Therefore there is obtained after $n$ measurements an improvement in the signal/noise ratio by the factor $\sqrt{n}$. This known method has however the disadvantage that the n-fold repetition of the measurement requires a correspondingly long measuring time and the costs for obtaining such a spectrum are very high.

Another possibility of increase the sensitivity consists in using the so-called Fourier method. In this case the signal amplitudes are not shown individually dependently on the frequency but all the signals in question are simultaneously taken during a definite sufficient time period so that the above referred to interferogram is produced. The interferogram is the representation of an interference signal with a time-dependent amplitude the value of which is obtained from the superimposition of all the signals of different frequencies and different amplitudes contained in the spectrum. From the interferogram so obtained the individual signals of the spectrum can be determined by a Fourier analysis. This Fourier analysis can be obtained purely mathematically and is conveniently effected by means of a correspondingly programmed computer of the digital or analog type. It should however also be understood that also classical wave-shape analyzers can be adopted.

The advantage of obtaining an interferogram consists in the fact that the timer required for obtaining it is very much less than that required for obtaining all the individual lines of a spectrum, which is especially of importance if the operation is to be repeated many times to increase the signal/noise ratio. The repeated taking of such an interferogram must be effected before the Fourier analysis since the latter can only give good results of the signal to be analyzed is well clear of the noise level. For this purpose the interferogram is supplied to a store with a plurality of storage plates which each pertain to one instant of the interferogram and by which the amplitudes of the interferogram pertaining to the individual instants are stored. The greater the desired resolution the greater must be the number of the storage plates used for the store.

The Proton spectra of high resolution core resonance spectrometry have a width of about 1000 Hz at the usual measurement frequencies. If the desired resolution amounts to 0.5 Hz and two points for each resonance line are regarded as sufficient the store must already have 4000 storage plates. The spectral width of other nuclei are however much greater than those of protons and on the other hand with protons resolutions of 0.1 Hz are already obtained so that here storage means are required which have many more than 4000 storage plates. If therefore for example proton spectra are to be obtained without loss of resolution or for the usual resolution spectra of nuclei such as $P^{31}$ or $C^{13}$ are to be obtained the storage means and the computer requirements involve a very great capacity. For this reason the costs for obtaining a spectrum by the use of the Fourier method are extremely high if adequate resolution is to be obtained.

The invention has for its object to provide improvements and to obtain a rapid spectrum determination without loss of resolution and without using excessive demands for equipment. With this in mind the invention has for its object to improve the known method of Fourier analysis by which a high resolution can be obtained at low cost and for substantial spectral widths.

A further object is provide means and methods for assessment of interference phenomena in which all oscillations of a definite frequency band are filtered out of the interference signal and the Fourier analysis is limited to this frequency band.

By limitation to a partial range of the oscillations contained in the interference signal it is possible without affecting the resolution to use storage means and computers which have only a relatively small capacity so that the costs for such analysis are correspondingly low.

A definite part of the oscillations of the interference signal can be selected in a particularly simple way by changing the band width and center frequency of the selected frequency band with reference to the frequency content of the whole interference signal. If the interference signal is obtained repeatedly and stored to form an average value, only the portion of the interference signal lying within the intended frequency band is stored in accordance with a further development of the invention, in order that the saving of storage and computer capacity permitted by the invention can be fully utilized.

For filtering out a definite frequency band basically the measured signal voltages can be fed directly to a suitable filter, for example a tunable quartz filter. It is however extremely difficult to produce quartz filters with a variable band width and variable center frequency if the signal frequencies are high and the band widths very small in relation to the signal frequencies. Thus, for example, the signal frequencies in spin spectrometry are in the range of 10 to 100 MHz whereas the required band width lies between 10 and 10,000 Hz. Instability of the center frequency results in a deviation of the frequency band filtered out. If 10 percent of the band width is allowed for this deviation a filter stability requirement of $10^{-8}$ is required for a signal frequency of 100 MHz and a band width of 10Hz. Such filters, the center frequency and band width of which can be adjusted independently, cannot however be produced today.

Hence a further construction of the invention provides for such applications by the fact that the interference signal is mixed with at least one local oscillation frequency for conversion into a suitable intermediate frequency band and the intended frequency band then filtered out after transformation to this intermediate frequency band. In this way it is possible considerably to reduce the stringent requirements for the filters and moreover to choose the intermediate frequency band so that the production of such filters is particularly simple. Since the band width and the absolute accuracy of the center frequency remain invariable with such transformations the requirements for stability of the filter are reduced by the same factor that the selected intermediate frequency differs from the signal frequency.

A further particular advantage of this arrangement of the invention consists in the possibility of varying the local frequency to vary the center frequency of the intended frequency band in relation to the frequency content of the whole interference signal so that for selecting various portions of the spectrum no variation of the center frequency of the filter is required and a filter with a fixed center frequency can be used.

A change in the local frequency is synonymous to a change in the zero frequency point of the resonance frequencies contained in the interference signal because by the change in the local frequency all the signal frequencies contained in the interference signal are shifted from their absolute values. The zero point stability thus depends on the stability of the local frequency. It is therefore of importance that the local frequency shall be held constant with high accuracy, which can be effected in any known way.

With spin resonance spectrometers the nuclear magnetic resonance frequencies are proportional to the magnetic measuring field. It is known with spin resonance spectrometers to stabilize the ratio between the magnetic measuring field and the spin resonance frequency of a known material which will be referred to hereinafter as the spin resonance reference frequency or, shortly, as the reference frequency. With such spin resonance spectrometers it is then particularly advantageous to stabilize the local frequency not for itself independently but rather to hold constant the difference of the local frequency from the reference frequency at least approximately. In this way not only are costly devices for stabilizing the local frequency saved but the local frequency can follow changes in the reference frequency and thus of the magnetic measuring field whereby such changes are largely compensated. By this method of stabilizing the frequency difference the result is obtained that successively measured interferograms always contain the same resonance frequency values and the zero frequency point does not vary.

In many cases a simple mixing of the interference signal with a local frequency and an associated filtering is sufficient. However also a stepwise transformation of the interference signal by using several local and intermediate frequencies may be convenient. Hence one construction of the invention provides the transformation of the interference signal into a suitable intermediate frequency band in several steps in such manner that both the interference signal and also the local frequency stabilized before mixing on the basis of the reference frequency is mixed in each case with a further similar local frequency. This type of multi-stage transformation has the particular advantage that the further local frequency does not need to be stabilized since it is again extracted during the second mixing. The multi-stage transformation as such has the advantage that the overall amplification required can be effected in several frequency bands and therefore a small amplification is sufficient in one frequency band so that there is little tendency toward oscillation and the amplifier can be simply constructed.

In a further arrangement of the invention a local frequency is always used which lies outside the frequencies of the interference signal or an already filtered out frequency band of the interference signal. In this way disturbances due to second channel frequencies are reliably avoided. This requirement can however lead to the fact that the spacing between the local frequency and the useful range of the signal frequencies is relatively high so that the intermediate frequencies obtained from the difference frequencies lie in a region which is outside the most favorable intermediate frequency band. Also in this case a multiple conversion is helpful if in a further arrangement of the invention a first frequency band is filtered out of the interference signal from the intermediate frequency band obtained by a first conversion, of which the limit adjoining the first local frequency has a greater spacing from this first local frequency than the original interference signal and that then a second conversion is effected by a second further local frequency closely adjacent to the limit of the first frequency band. It is also possible in this case to effect the filtering by simple high and low pass elements of which one is used in the first intermediate frequency band and the other in the second intermediate frequency band. Both filters together provide a band pass the pass region of which is the same as the desired frequency band. However, especially after the first conversion, a band pass filter can be used by which the mixed main frequencies are excluded.

As already stated, one constructional form of the method according to the invention provides an improvement of the signal/noise ratio by means of an average value generator in which the portion of the interference signal lying in the intended frequency band is stored. In this case care must be taken that all filtered interference signals have precisely the same amplitude properties as a function of time. If this average value formation is performed in an intermediate frequency band a further arrangement of the invention provides for satisfying this condition by reason of the fact that the local frequencies are always a simple multiple of the repetiton frequency at which the interference signal is repeatedly excited. This arrangement permits the local frequencies used at the beginning of the interference signal which is subject to the Fourier analysis to have in each case the same phase position so that no deviation in the phase position of the intermediate frequency signal can occur which would result in changes in the phase of the local frequency.

As already indicated a preferred field of application of the method according to the invention is for spin resonance spectrometry. In spin resonance spectrometry the sample to be investigated is excited by HF pulses. In this case the condition for a satisfactory average value formation are always fulfilled if also the carrier frequency of the HF pulses is a whole multiple of the repetition frequency. The resulting condition that both the carrier frequency and also the local frequency are always a simple multiple of the repetition frequency is certainly desirable but not essential. It is however also important that if the carrier frequency has a desired phase position at the end of an exciting pulse the local frequency at the end of the exciting pulse must always have a constant phase position relatively to the carrier frequency. This condition is fulfilled if in the repetition period $T_r$ there is a whole number time difference $n \cdot T_r$ between the period of the carrier signal and the period of the local oscillation signal. From this fact there is obtained for the application of the method to spin resonance spectrometry the condition, for a correct addition of the portion of the converted interference signal lying in the restricted filtered-out frequency band, that the local frequency used must always have a spacing from the carrier frequency of the HF pulses which is equal to a simple multiple of the repetition frequency.

A particularly simple modification of the method according to the invention consists in the fact that only one local frequency is used which is equal to the carrier frequency of the HF pulses. It will easily be seen that in this case the condition already referred to that at the end of an exciting pulse the carrier frequency and the local frequency have the same phase position is necessarily fulfilled. The method according to the invention therefore includes the case that the simple multiple of the repetition frequency can be equal to zero in order that the local frequency differs from the carrier frequency. This modification of the method according to the invention is particularly simple and leads to a very simple construction of devices suitable for carrying out this method. However, difficulties may occur in this case with very broad spectra as regards the excitation of the spin resonances since the local frequency and consequently also the carrier frequency must always lie outside the spectrum. Hence in many cases a spacing between the carrier frequency and the local frequency is preferred.

Particularly stable conditions are obtained if in a further development of the method of the invention the repetition frequency is a simple fraction of the carrier frequency of the HF pulses since thereby the result is permitted that at the end of each excitation pulse the carrier frequency and consequently the local frequency have the same phase position and jitter effects which may result from differences in the pulse widths especially at low measuring frequencies are reliably avoided.

Apart from noise and the jitter effects already referred to disturbances can also be caused by periodically occurring signals which cannot be elminated by the measures previously referred to since all these measures themselves have a periodic character. On the assumption that the carrier frequency of the HF pulses is chosen as the local frequency there is the possibility of choosing the repetition frequency with a statistical change so that now also periodic changes can be elminated. It is particularly effective and simple if the repetition frequency is a statistically changing simple fraction of the carrier frequency of the HF pulses.

In the application of the method of the invention to spin resonance spectrometry with an excitation of the spectra by HF pulses it may on the other hand be of advantage if a carrier frequency is chosen for the HF pulses which is at least approximately constantly spaced from the reference frequency and falls in the frequency band of the interference signal since then the individual interference signals are excited in a preceisely identical way and further a particularly effective excitation is obtained. Furthermore it is then possible to obtain a type of pre-fitting of the interference signal by the fact that predetermined frequency bands of the interference signal are selectively excited by selection of the carrier frequency and the form of the exciting signal. It is known that the band width of a pulse is reduced the longer is the pulse. By the application of relatively long excitation pulses it is therefore possible to excite spin resonances in a limited range in the neighborhood of the carrier frequency. Also the pulse shape itself, that is to say the rise time and the peak shape, influence the band width of the pulse or the excitation frequencies contained in the pulse so that in this case further possibilities of variation are obtained.

The invention relates moreover to a device for carrying out the method of the invention. Such a device comprises a generator device for producing one or more local frequencies, a mixer device to which the interference signal and the local frequencies produced by the generator are fed and a filter arrangement for filtering out definite frequency bands from the interference signal after conversion to a suitable intermediate frequency. It is of particular advantage if the mixer arrangement embodies at least one phase detector since these detectors have good linearity and are of simple construction and moreover have a low pass characteristic which suppresses the fundamental of the signals fed to such detector.

In a preferred constructional form of the invention, the mixer arrangement comprises two successively connected mixers to each of which a local frequency is supplied by the generator arrangement, the local frequency being lower than the respective signal frequency and the first mixer is followed by a band filter or a high pass filter and the second mixer by a low pass filter. This construction of the device permits in a particularly simple way the provision of an embodiment of the method according to the invention in which a first frequency band is filtered out of the interference signal in the intermediate frequency band after a first conversion, and of which the limits in the neighborhood of the first local frequency have a greater spacing from this first local frequency than the original interference signal and in which a second conversion is obtained by a second local frequency closely adjacent the limits of the first frequency band.

A modification of the method according to the invention provides that for transformation of the interference signal both the interference signal and also a stabilized local frequency are mixed with a further similar local frequency before mixing. For carrying out this method the device according to the invention the generator arrangement may embody a highly stable fundamental oscillator as the generator which produces a local frequency adjacent to the interference signal frequencies. In this embodiment of the invention further one local oscillator and two mixers are provided to both of which the signal from the local oscillator is fed and of which one receives the interference signal and the other the local frequency. The intermediate frequency signals formed in the two mixers are then supplied to a further mixer of the mixer arrangement.

As stated above it is advantageous if various of the frequencies used in the method according to the invention have fixed spacings one from the other. To fulfil this condition it would for example be possible to use separate oscillators for the individual frequencies which are locked one to the other by stabilizing circuits. It is however more simple in a further arrangement of the invention to provide a highly stable fundamental oscillator in the generator arrangement, which comprises frequency synthesizes, multipliers, dividers and the like to supply the various local frequencies, exciting frequencies and repetition frequencies.

In the device according to the invention there is associated with the output of the final filter a device for Fourier analysis of the output signal especially a suitably programmed computer.

Figure 2:
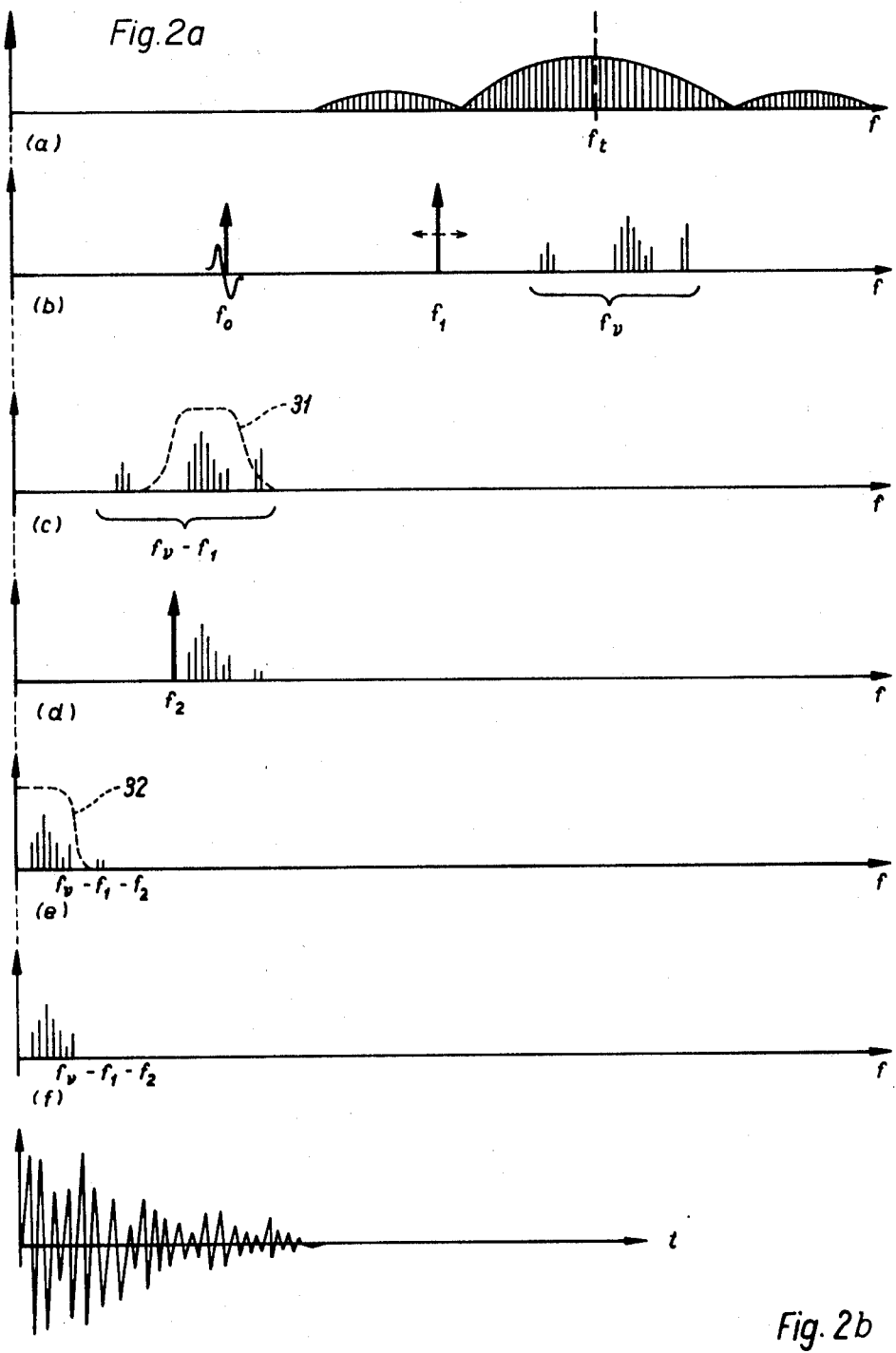
Figure 3:
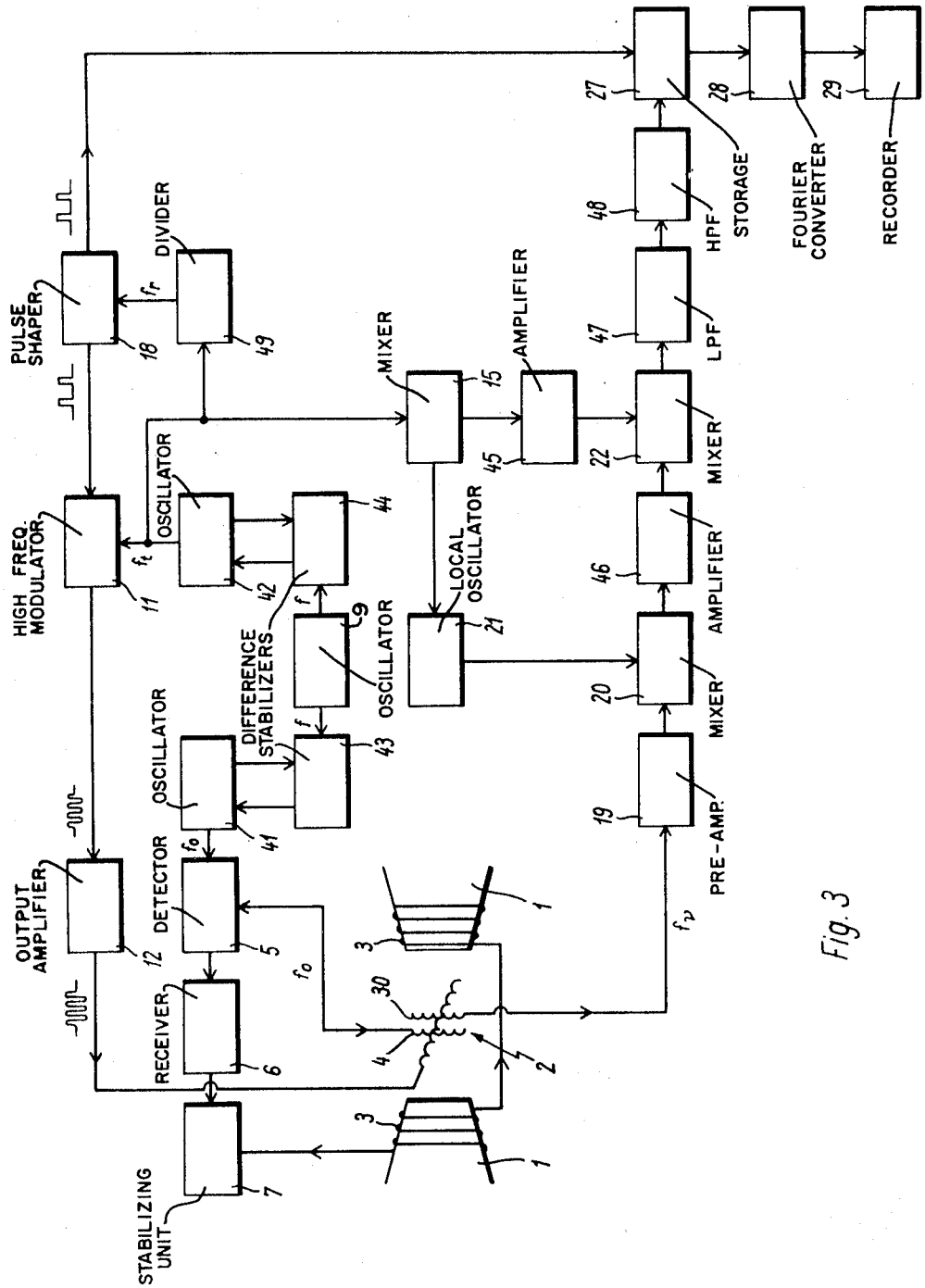
Figures 4A, 4B:
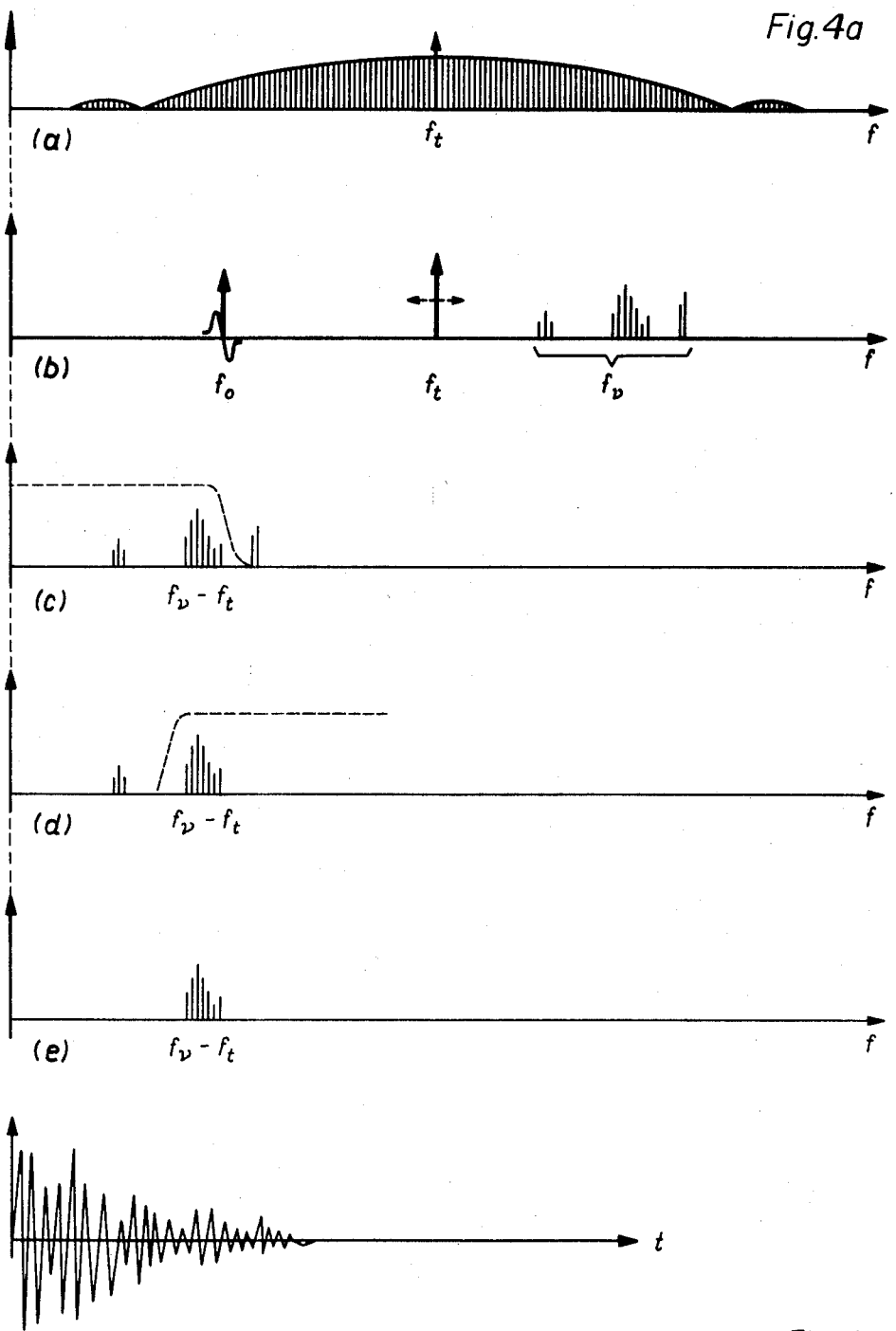

Further details and arrangements of the invention will be seen from the following description in which the invention is described and explained on the basis of the constructional examples shown on the drawings of devices for carrying out the method of the invention. The features referred to in the description and drawings can be used individually in other constructional forms of the invention or several of them can be used in various combinations, and in which:

FIG. 1 shows a block circuit diagram of a device for carrying out a first modification of the method of the invention, FIGS. 2a and 2b are diagrams to explain the method of operation of the device according to FIG. 1, FIG. 3 shows a block circuit diagram of a further device for carrying out another modification of the method of the invention, and FIGS. 4a and 4b are diagrams for explaining the method of operation of the device according to FIG. 3.

The spin resonance spectrometer shown in FIG. 1 comprises a magnet 1 in the air gap of which the test pieces to be investigated fro spin resonances are arranged. The magnetic field $H_0$ in the air gap 2 is held in a fixed gyromagnetic ratio to a spin resonance reference frequency $f_0$ by means of a winding 3 arranged on the magnet, to which the reference frequency $f_0$ is supplied by means of a measuring coil 4 to a reference sample located in the air gap 2 of the magnet 1. The measuring coil 4 is connected to a detector arrangement 5, for example a Purcell bridge, which produces a detector signal dependent on the frequency $f_0$ and supplies this detector signal through a receiver 6 to a field stabilizing unit 7 which feeds the winding 3 of the magnet 1 with such a current that the spin resonance reference frequency $f_0$ of the reference sample stands in the desired gyromagnetic ratio to the measuring field $H_0$. The frequency $f_0$ used for exciting the reference sample is supplied to the detector arrangement 5 from a frequency synthesizer 8 to which a primary frequency f is supplied from a fundamental oscillator 9. The use of a frequency synthesizer 8 has the advantage that the reference frequency $f_0$ can be adjusted to the reference sample used independently of the frequency f of the fundamental oscillator.

The sample to be investigated by means of the spin resonance spectrometer according to FIG. 1 is also located in the air gap 2 of the magnet 1 and high frequency pulses are periodically fed to this sample by means of an exciting coil 10 which is supplied from an HF modulator 11 and an output amplifier 12 before reaching the exciting coil 10. The HF modulator is supplied with a high frequency $f_t$ by a second frequency synthesizer 13 connected to the fundamental oscillator 9 and which frequency $f_t$ stands in a definite ratio to the reference frequency $f_0$ and so chosen that it lies in the band of the resonance frequencies of the sample to be investigated which is located in the air gap 2. These reference frequencies $f_r$ are extracted by means of a coil 30 and supplied to the analysis means still to be described.

A third frequency synthesizer 14 is connected to the fundamental oscillator 9 which produces a first local frequency $f_1$. This local frequency is moreover also receives the output signal at the frequency $f_t$ from the frequency synthesizer 13 and produces an output signal at frequency $f_d$ which is equal to he spacing between the carrier frequency $f_t$ and the first local frequency $f_1$. This difference frequency $f_d$ passes to a divider stage 32 in which the frequency $f_d$ is divided in the ratio $f_r = f_d/n$.

The frequency $f_r$ is supplied as a pulse repetition frequency to a pulse former 17 which is connected to the HF modulator 11 and determines the repetition frequency as well as the shape of the HF pulse at the carrier frequency $f_t$. The frequency $f_r$ is furthermore supplied to a multiplier 33 in which it is multiplied by the factor m. The output signal of the multiplier 33 passes to a further difference generator 34 to which also the carrier frequency $f_t$ is supplied and which produces an output signal $f_2 = f_t - mf_r$.

The signal extracted by means of the coil 30 is supplied to a pre-amplifier 19 and then to a second mixer 20 which, like the first mixer 15 to which the first local frequency $f_1$ is supplied, receives a local signal $f_M$ from a local oscillator 21.

The output signals of the two mixers 15 and 20 pass after amplification to a further mixer 22 to which a filter 23 is connected. This filter is a band pass filter. The output of the filter 23 after passing a zero frequency amplifier 24 is fed to a phase detector 25 operating as a mixer which receives as a reference signal the difference frequency $f_2$ from the further difference generator 34. The output signal of the phase detector 25 is fed to a low pass filter 26 the output signal of which is fed into a store 27 in step with a signal from the pulse former 17. The signals contained in the store 27 are manipulated by a Fourier converter 28 which may be, for example, a Fourier-Analyzer 5450A manufactured by the Hewlett Packard Corporation, Palo Alto, California. The result of this manipulation is indicated by means of a recorder or charter 29 connected to the Fourier converter 28.

During the measurement of the spectra by means of the device described partial magnetisations of the sample which pertain to the various resonance lines and which are formed in the direction of the field in the static magnetic field $H_0$ on completion of the relaxation of the system are all rotated simultaneously, for example through 90°, in the plane perpendicular to the static field direction by the HF pulse produced in the HF modulator 11, amplified in the power amplifier 12 and fed to the sample through the exciting coil 10. After the end of this pulse when therefore all partial magnetizations have executed a rotation through 90° these partial magnetizations execute a precession in the plane perpendicular to the direction of the field. Since the resonance frequencies pertaining to the individual partial magnetizations are different the precession speeds are also different (see G. Laukien "Kernmagnetische Hochfrequenzspektroskopie" Volume 38/1). The precession movements of the spin induce voltages in the detector coil 30 which permit observation of the precession movements. These induced voltages then form an interference signal since the induction voltages pertaining to the individual resonance lines are superimposed on one another. By means of the device according to FIG. 1 this interference signal is converted in several stages into a suitable intermediate frequency range and then subjected to a Fourier conversion in order to determine the oscillations contained in the interference signal.

The line (a) of the diagram of FIG. 2 (a) shows the frequency spectrum of the HF pulses supplied by the modulator 11 and fed to the sample through the exciting coil 10, together with the carrier frequency $f_t$. The marker spacing is determined by the repetition frequency $f_r$ and the envelope by the shape of the pulse. Since the repetition frequency $f_r$ is very much less than the carrier frequency $f_t$, for example only 10 Hz in comparison with a carrier frequency of the order of 100 MHz, the intensity distribution is seen virtually continuously.

In the line (b) of the diagram according to FIG. 2 (a) the resonance frequencies $f_v$ to be measured are shown, that is the lines of the spectrum. Moreover in line (b) there is shown the reference frequency $f_0$ with the associated distribution curve of the Purcell bridge 5 and the first local frequency $f_1$ which is spaced from the reference frequency $f_0$ by the fixed amount which may however be changed by means of the second frequency synthesizer 14. The constancy of the selected spacing permits a common fundamental oscillator 9 to be used for controlling the first and the second frequency synthesizers 8 and 14.

In the line (c) the frequency spectrum with the intermediate frequency $f_v - f_1$ at the output of the mixer 22 together with the characteristic (31) of the filter 23 is shown. As shown in FIG. 1 the mixing of $f_v$ and $f_1$ is not performed directly but initially both the resonance frequency $f_v$ and also the first local frequency $f_1$ are mixed with the signal $f_M$ of the local oscillator 21 so that the first and in the second mixers 15, 20 respectively the frequencies $f_1 - f_M$ and $f_v - f_M$ are formed from which in the third mixer the intermediate frequency signal $f_v - f_1$ is produced. The formation of intermediate frequencies from the signals $f_1$ and $f_v$ has the particular advantage that the local frequency $f_M$ does not need to be specially stabilized since it is eliminated in the third mixer 22.

Line (c) makes it clear that by changing the local frequency $f_1$ and with the same filter 23 the spectrum can be shifted relative to the filter since by varying $f_1$ the spectrum is shifted along the frequency axis whereas the pass curve of the filter remains fixed. As is shown by lines (b) and (c) the local frequency $f_1$ is so chosen that it lies sufficiently far beneath the resonance frequency $f_v$ so that in the pass region of the filter 23 represented by the curve 31 there is neither the local frequency $f_1$ nor any second channel frequencies but specifically only the resonance lines converted into this intermediate frequency range. The low frequency limit of the pass region of the filter has a larger spacing from the first local frequency $f_1$ than the whole interference signal $f_v$. The frequency range filtered out from the interference signal by means of the filter 23 is shown in line (d) of FIG. 2 (a) together with the second local frequency $f_2$ which is equal to the difference frequency $f_t - mf_r$ and is near the limits of the filtered out intermediate frequency range.

In the constructional example shown in FIG. 1 the mixing is effected in a phase detector 25 to which the second local frequency is supplied as a reference signal. The result is the signal $f_v - f_1 - f_2$ shown in line (e). The low pass filter 26 connected to the phase detector 25, the pass region of which is shown in line (e) by the dotted curve 32, eliminates the lines lying to the right-hand side of the main group to the filtered-out frequency band so that the partial spectrum shown in FIG. 2(b) remains. It should however be pointed out that at the output of the low pass filter 26 there appears not the spectrogram according to line (f) but rather the interference signal indicated in FIG. 2(b) which is obtained from combining the frequencies of the filtered out frequency band according to FIG. 2(b).

In a spectrometry operation the sample is periodically excited at the repetition frequency $f_r$ so that also the interference signal according to FIG. 2 (b) appears periodically. The periodically occuring interference signal is fed to the store 27 and summed in this store to improve the signal/noise ratio before it is subjected to Fourier conversion. Such a summing of the recurring interference signal however only leads to the required result if the interference signals are completely concident, that is also as regards their phase positions. Since the interference signal is excited at carrier frequency $f_t$ they have a definite always uniform phase position relative to the carrier frequency. It is therefore sufficient for a uniform phase position of the interference signal if care is taken that the local frequency has the same phase position with reference to the carrier frequency at the end of each HF pulse. From this it follows that if during a repetition period $T_r$ the carrier frequency has $x$ periods $T_t$ the local frequency must execute $(x-n)$ periods $T_1$ where X is any desired value and $n$ is a whole number. From this follows the equation:

$$T_r = xT_t = (x-n) T_1.$$

For the frequencies then $$f_r = f_t/x = f_1 (x-n).$$

By simple substitution there is then obtained $$f_t - f_1 = nf_t/x = nf_r.$$

Hence the difference between the carrier frequency and the local frequency must be a simple multiple of the repetition frequency according to circumstances. This condition is fulfilled in the embodiment according to FIG. 1 by the fact that the difference $f_t - f_1$ is formed from the carrier frequency and the local frequency by means of the difference generator 31 and this frequency is divided in the divider stage 32 by the whole number $n$ in order to form the repetition frequency $f_r$. In order that also for the second local frequency $f_2$ the condition $f_t - f_2 = nf_r$ is fulfilled the repetition frequency $f_r$ is fed to the multiplier stage 33 in which the product $mf_r$ is formed and then this product is fed to a second difference stage in which the difference $f_t - mf_r$ is formed which then represents the second local frequency $f_2$.

FIG. 3 shows a further embodiment of the invention which differs only in detail from the embodiment according to FIG. 1. So far as similar parts are used these parts embody the same references in FIG. 3 as in FIG. 1 and references made to the description of FIG. 1. There is the difference however that the frequencies stabilized by means of the fundamental oscillator 9 are not produced by means of frequency synthesizer but by means of separate oscillator 41 and 42, the frequencies of which are held constant by means of difference stabilizers 43, 44 but adjustably spaced from the frequency of the fundamental oscillator 9. Thus the oscillator 41 with the associated difference stabilizers 43 serves to produce a constant reference frequency $f_0$ while the oscillator 42 produces the carrier frequency $f_t$ in conjunction with the associated difference stabilizer 44 which is fed to the HF modulator 11.

In this embodiment of the invention this carrier frequency $f_t$ is used both as the local frequency and is fed to mixer 15 in which this frequency, just like the signal frequency $f_r$, is mixed in the mixer 20 with the frequency $f_M$ of the local oscillator 21. To ensure that the output signals of the mixers 15 and 20 are amplified before they are combined in the third mixer 22 additional amplifiers 45 and 46 are shown, the inputs of which are connected to the mixers 15 and 20 and the outputs are connected to the third mixer 22. It will be understood that such amplifiers can also be provided in the embodiment according to FIG. 1. Since the carrier frequency $f_t$ is applied directly as the local frequency, the output of the third mixer 22 is directly the interference signal freed from the carrier frequency $f_t$ which then passes through a low pass filter 47 and a high pass filter 48, the limit frequencies of which are adjustable, and the output signal of the high pass filter 48 is fed to the storage 27. Furthermore in this embodiment of the invention the repetition frequency $f_r$ for the pulse shaper 18 is derived from the carrier frequency $f_t$ by means of a divider stage 49 so that the repetition frequency $f_r$ is a simple fraction of the carrier frequency $f_t$ and consequently the carrier frequency and the repetition frequency are in phase. In this way special stable conditions are obtained if especially at low measuring frequencies jitter effects are to be avoided as regards the constancy of the pulse widths. If however periodic disturbances in the signal observation occur, that is in the amplifier branch 19, 20, 46, 22, 47, 48, 27, then it may also be convenient, assuming that $f_t = f_1$, to select $f_r$ as a statistically varying value since then the periodic disturbances are averaged out when handling the signal in the store 27.

It is even possible to choose the repetition frequency $f_r$ both as a simple fraction of the carrier frequency $f_t$ and also as a statistically varying value if the figure for the whole numbered fraction of the carrier frequency is chosen statistically. Then both jitter effects and also periodic disturbances are avoided.

As will be seen from FIG. 4($a$) the frequency spectrum of the HF pulses supplied by the modulator 11 must be so broad that the resonance frequencies $f_v$ to be measured still lie within the pulse spectrum but the carrier frequency $f_t$ lies outside of these resonance frequencies $f_v$, as will be seen from the lines ($a$) and ($b$) of the diagram of FIG. 4 ($a$). Also in this case however a shift of the carrier frequency $f_t$ relative to the resonance frequencies $f_v$ is possible for varying the selected frequency band.

The line ($c$) shows the resonance frequencies $f_v - f_t$ after combining, that is at the output of the mixer 22, in conjunction with the pass curve of the low pass filter 47. By changing the limit frequency of the low pass filter 47 and/or the correct choice of the carrier frequency $f_t$ the result is obtained that the greater fraction of the resonance frequencies falls outside of the pass range of the low pass filter 47 and are therefore eliminated.

Line ($d$) shows the remaining resonance frequencies at the output of the low pass filter 47 in conjunction with the pass curve of the high pass filter 48. Also in this case again by adjusting the lower limit frequency of the high pass filter and/or of the carrier frequency $f_t$ the result is secured that the lower resonance frequencies $f_v - f_t$ are no longer transmitted by the high pass filter which is in the form of the interference signal according to FIG. 4 ($b$).

It should be understood that the invention is not limited to the constructional examples shown but changes are possible without departing from scope of the invention. In particular the invention is not limited to application in spin resonance spectrometry but can be applied wherever interference signals occur. Furthermore according to particular requirements and the frequency bands present a simple transformation into one intermediate frequency band may suffice. On the other hand transformation with still more stages than are employed in the constructional examples shown may also be used. Furthermore the intermediate amplification of the signals may be arranged as desired and as will be understood by those skilled in the art. Finally it is also possible to produce the required frequencies in other ways than that shown, and it is also possible to use the fundamental oscillator directly for one of the required frequencies, for example for the reference frequency $f_0$ or the carrier frequency $f_t$ and to derive the other frequencies therefrom. Finally the invention is independent of the manner in which the selected frequency band is subject to Fourier transformation or analysis since these details will be readily understood by those skilled in the art.

What we claim is:

1. Apparatus for the Fourier analysis of interference signals comprising generator means for producing at least one local oscillation frequency, mixer means to which the interference signal and said at least one local oscillation frequency produced by said generator means are supplied for converting said interference signal into suitable intermediate frequency bands, and filter means for filtering out definite frequency bands from said interference signal after conversion into suitable intermediate frequency bands by said mixer means.

2. Apparatus according to claim 1, wherein said mixer means includes at least one phase detector.

3. Apparatus according to Claim 1, wherein said mixer means comprises two successively connected mixers to each of which a local frequency is supplied by said generator means, which local frequency lies below a particular interference signal frequency and wherein the first mixer is followed by a band pass filter, and the second mixer is followed by a low pass filter.

4. Apparatus according to Claim 1, wherein said generator means includes a highly stable generator section which produces a first local frequency adjacent to the frequencies of the interference signal and a local oscillator and wherein said mixer means includes two mixers to both of which a second local frequency of the local oscillator is supplied and one of which receives the interference signal and the other the first local frequency and wherein the intermediate frequency signals formed in the two mixers are supplied to a further mixer of the mixer means.

5. Apparatus according to claim 4, wherein said generator means comprises a fundamental oscillator, first, second and third frequency synthesizer means respectively controlled by said fundamental oscillator for supplying the various local frequencies, excitation frequencies and repetition frequencies.

6. Apparatus according to claim 1, wherein said generator means for at least one of the required frequencies each comprises an oscillator and the oscillators are difference-stabilized with reference to a fundamental oscillator formed by each of the oscillators used.

7. Apparatus according to claim 1, wherein means for Fourier analysis of said filtered out bands, in particular a programmed computer, is connected to the output of said filtering means.

8. An apparatus according to claim 4, including means for amplifying the outputs of said two mixers prior to the supplying of the outputs to said further mixer.

9. An apparatus according to claim 5, wherein one of said frequency synthesizer means includes arithmetic circuitry, responsive to the output of said second frequency synthesizer means and said fundamental oscillator for generating said repetitive frequency, including a first difference generator and a divider circuit connected in series.

10. An apparatus according to claim 9, wherein said third frequency synthesizer means further includes a multiplier and a second difference generator connected in series to the output of said divider, said second difference generator receiving the output of said frequency synthesizer means for generating a further oscillator signal supplied to said further mixer means.

11. In a method of Fourier analysis of interference signals, especially those corresponding to interferograms such as are obtained in spin resonance spectrometry, the improvement comprising the steps of:

a. filtering out all oscillations from an interference signal of a predetermined frequency band included in the spectrum within which said interference signals lie; and b. carrying out Fourier analysis on said filtered out frequency band by determining the frequencies and amplitudes of said filtered out oscillations mathmatically.

12. A method according to claim 11, wherein said step (a) comprises the steps of:

selecting a frequency band with reference to the frequency content of an entire interference signal; and varying the frequency band and the center frequency of said selected frequency band.

13. A method according to claim 11, wherein step (a) is carried out for repeatedly obtained interference signals from which an average value is obtained, so that said filtered out oscillations correspond to said frequency band for said average value and further including the step of storing said filtered out signal prior to said step (b) of Fourier analysis.

14. A method according to claim 11, further comprising the step of repeating step (a) and storing the filtered out oscillations after each repetition to form an average value of a filtered-out oscillation prior to the step (b) of carrying out Fourier analysis on said average value.

15. A method according to claim 11, wherein step (a) includes the step of converting said interference signal into a predetermined intermediate frequency band by mixing said interference signal with at least one local oscillation frequency.

16. A method according to claim 15, wherein said step of converting further includes varying the center frequency of said predetermined frequency band with reference to the frequency content of the entire interference signal by varying said local oscillation frequency.

17. A method according to claim 15, in which the ratio between the magnetic measuring field and the reference frequency is stabilized by the application of a spin resonance reference frequency, comprising the steps of maintaining the difference between the local oscillation frequency and said reference frequency approximately constant.

18. A method according to claim 17, wherein said step (a) further comprises the step of stabilizing said interference signal and said one local oscillation frequency to provide a first additional mixed frequency and mixing said one local oscillation frequency with said additional local oscillation frequency to provide a second additional mixed frequency and mixing said first and second additional mixed frequencies.

19. A method according to claim 15, wherein said local oscillation frequency lies outside one of: (i) the band within which the oscillation frequencies of said interference signal lie, and (ii) a previously filtered out frequency band of the interference signal.

20. A method according to claim 19, wherein said step (a) further comprises filtering out the first frequency band of signals from said predetermined intermediate frequency band subsequent to the step of converting, with respect to which the limit adjacent said local frequency has a greater spacing than the interference signal and then converting said filtered out first frequency band of signals into a predetermined lower frequency band by combining said filtered out first frequency band with a second local oscillator frequency closely adjacent to the limit of said first frequency band.

21. A method according to claim 20, wherein step (a) is carried out for repeatedly obtained interference signals from which an average value is obtained, so that said filtered out oscillations correspond to said frequency band for said average value and further including the step of storing said filtered out signal prior to said step of Fourier analysis, and wherein said second local oscillator frequency is formed from a single multiple of the repetitive frequency at which said interference signal is repeatedly obtained.

22. A method according to claim 21, including the steps of exciting spin resonance by the generation of high frequency pulses and wherein the spacing of said second local oscillator frequency from the carrier frequency of said high frequency pulses is a simple multiple of the repetitive frequency.

23. A method according to claim 22, comprising the step of generating high frequency pulses from a single source of carrier signals.

24. A method according to claim 22, wherein the repetitive frequency is a simple fraction of the carrier frequency of said high frequency pulses.

25. A method according to claim 24, further comprising the step of varying said repetitive frequencies statistically.

26. A method according to claim 24, further comprising statistically varying said repetitive frequency as a simple fraction of said carrier frequency of said high frequency pulses.

27. A method according to claim 13, further comprising exciting spin resonances by the application of high frequency pulses having a predetermined carrier frequency which has an approximately constant spacing with respect to the reference frequency for said spin resonances and falls within the frequency spectrum of said interference signals.

28. A method according to claim 27, wherein step (a) comprises preliminarily filtering said interference signal in the form of selectively exciting predetermined frequency bands of said interference signal by selecting the carrier frequency and the wave form of the output pulses.

* * * * *